United States Patent [19]

Miller

[11] 4,286,481
[45] Sep. 1, 1981

[54] POWER TRANSFER DEVICE

[76] Inventor: Bernard J. Miller, R.D. #1, Box 133, West Alexander, Pa. 15376

[21] Appl. No.: 99,210

[22] Filed: Nov. 30, 1979

[51] Int. Cl.³ ............................................. F16H 1/30
[52] U.S. Cl. ..................................... 74/799; 74/713; 74/417; 74/410
[58] Field of Search ................. 74/713, 710, 777, 799, 74/417, 410

[56] References Cited

U.S. PATENT DOCUMENTS

| | | | |
|---|---|---|---|
| 1,403,994 | 1/1922 | Wegman | 74/713 |
| 2,200,153 | 5/1940 | Bush | 74/713 |
| 2,463,855 | 3/1949 | Crawford | 74/799 |

FOREIGN PATENT DOCUMENTS

| | | | |
|---|---|---|---|
| 309785 | 12/1918 | Fed. Rep. of Germany | 74/713 |
| 379801 | 8/1923 | Fed. Rep. of Germany | 74/713 |
| 2264226 | 10/1975 | France | 74/713 |
| 34951 | 9/1952 | Poland | 74/713 |
| 22325 | of 1905 | United Kingdom | 74/799 |

*Primary Examiner*—Lawrence J. Staab
*Attorney, Agent, or Firm*—Harvey B. Jacobson

[57] ABSTRACT

A power transfer device including a gear box which is rotatably driven from a suitable power source and provided with an output shaft for transmitting power to a desired location at a predetermined speed in relation to the input rotational speed of the gear box and a stationary shaft projecting from the gear box in which the stationary shaft and output shaft have bevel gears on the inner ends thereof in meshing engagement with bevel gears journaled on independent parallel shafts extending transversely of the gear box with each of the bevel gears on the parallel shafts including a spur gear integral therewith and in meshing engagement with each other with the spur gears having a predetermined ratio for determining the output shaft speed with the structural arrangement being such that the forces on the parallel shafts for the spur gears and bevel gears rigid therewith are neutralized. The specific arrangement of components is such that rotational movement of the gear box is necessary to produce output shaft movement whereas the output shaft cannot be rotated when the gear box is not being driven.

2 Claims, 3 Drawing Figures

POWER TRANSFER DEVICE

BACKGROUND OF THE INVENTION

1. Field of the Invention

The present invention generally relates to a device for transmitting power from a power source to an output shaft in a manner that torque forces exerted on certain of the gears in the gear train are neutralized and the output shaft cannot be rotated unless the gear box forming part of the power transfer device is driven in a rotatable manner.

2. Description of Relevant Art

Many power transfer devices have been provided for transmitting power from a prime mover or other power source to a point of use of rotational power with such developments including various types of transmissions, gear systems, and the like. The following U.S. patents are exemplary of the development in this field of endeavor and represent the most relevant patents known to me.

U.S. Pat. Nos.
189,914—Apr. 24, 1977—Blakeslee
477,095—June 14, 1892—Adams et al
741,931—Oct. 20, 1903—Sandell
789,910—May 16, 1905—Hill
805,740—Nov. 28, 1905—Lowe
2,090,810—Aug. 24, 1937—Russell et al
2,200,153—May 7, 1940—Bush
2,221,186—Nov. 12, 1940—Grosch
2,376,900—May 29, 1945—Case
4,006,607—Feb. 8, 1977—Kane
4,077,278—Mar. 7, 1978—Combastet.

While the above patents disclose various types of power transfer devices, none of them discloses the particular arrangement of gears which requires that the gear box be rotatably driven in order to provide rotation of an output shaft with the output shaft not being capable of being driven when the gear box is stationary.

SUMMARY OF THE INVENTION

An object of the invention is to provide a power transfer device to transfer rotational torque from an input source such as a prime mover or the like to an output shaft connected with any suitable point of use in which rotational torque is necessary to drive a machine, device, or the like, and a gear box is provided with a gear assembly disposed therein and oriented and constructed in a manner that torque forces or pressures exerted on meshing gears within the gear box are neutralized and it is necessary for the gear box to be rotatably driven in order to produce rotation of an output shaft with the output shaft not being capable of being rotated when the gear box is not being rotatably driven.

Another object of the present invention is to provide a power transfer device in accordance with the preceding object in which a stationary shaft also extends from the gear box and is stationarily mounted to a fixed frame or other structure by any suitable means with the stationary shaft and output shaft being disposed in opposed relation and provided with bevel gears on the inner ends thereof which are spaced from each other.

A further object of the present invention is to provide a power transfer device in accordance with the preceding objects in which the gear box is provided with a pair of parallel supporting shafts extending perpendicularly to the bevel gears on the inner ends of the stationary shaft and output shaft with the pair of shafts each including a bevel gear thereon in meshing engagement respectively with the bevel gears on the output shaft and stationary shaft and spur gears integral with the bevel gears on the pair of shafts with the spur gears being in meshing engagement with each other and having different sizes and number of teeth thereon to produce a desired output ratio between the rotational input of the gear box and the rotational output of the output shaft.

Yet another object of the present invention is to provide a power transfer device in accordance with the preceding objects having a balanced structural arrangement which is quite simple and dependable in operation and capable of use in many orientations where it is desired to transmit rotational power to a machine, or the like, requiring a particular rotational torque and speed with the output shaft of the power transfer device remaining stationary until a power source is drivingly connected to the gear box thereby assuring that the output shaft cannot be driven by the machine or other device to which it is connected.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
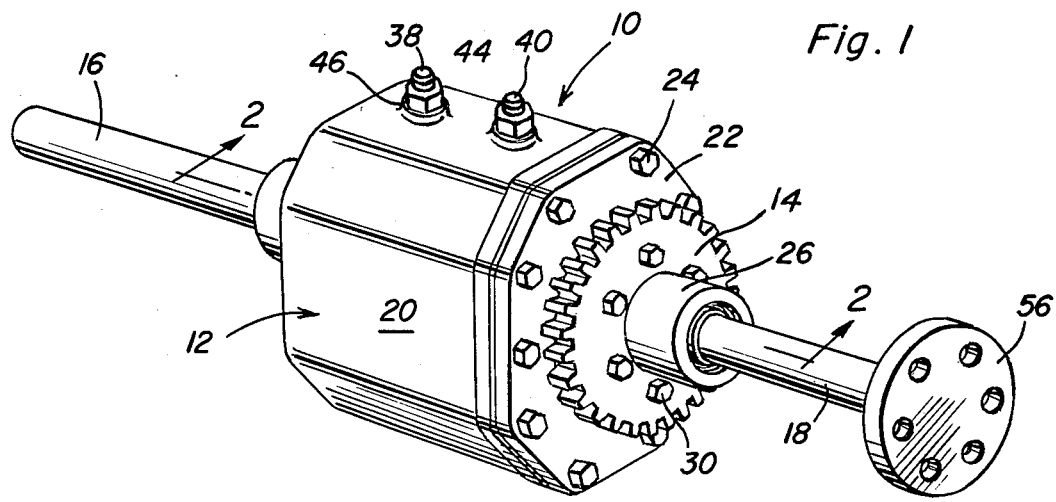
FIG. 1 is a perspective view of the power transfer device of the present invention.

Referring now specifically to the drawings, the power transfer device of the present invention is generally designated by the numeral 10 and includes a gear box or casing generally designated by the numeral 12 which includes an input gear 14 connected therewith and includes an output shaft 16 projecting from one end thereof and a stationary shaft 18 projecting from the other end thereof with the shafts 16 and 18 being in alignment with each other and extending internally of the gear box 12.

The gear box 12 includes a peripheral wall 20 of any suitable shape and configuration and end walls 22 one of which may be removable by the use of suitable set screws, bolts, or the like, 24 to provide access to the interior of the gear box 12. Also, each end wall 22 is provided with a cylindrical boss or axial extension 26 at the center thereof with the bosses 26 receiving the shafts 16 and 18 and rotatably journaling the shafts 16 and 18 in relation to the gear box 12 by the use of spaced tapered roller bearings 28 which serve as longitudinal thrust bearings as well as radial bearings, so that the gear box 12 and the shafts 16 and 18 may rotate in relation to each other. Also, one of the end walls or any other portion of the gear box or casing is provided with the input gear 14 rigidly affixed thereto such as by set screws or bolts 30 to enable any desired type and size of gear 14 to be connected to the gear box 12. The input gear 14 may be in the form of a spur gear, sprocket gear or any other suitable type of drive, including a V-belt pulley, or the like, in order to connect a driving source, such as a prime mover or the like to the gear box 12 to rotate the gear box 12 at a desired rotational speed.

Figure 2:
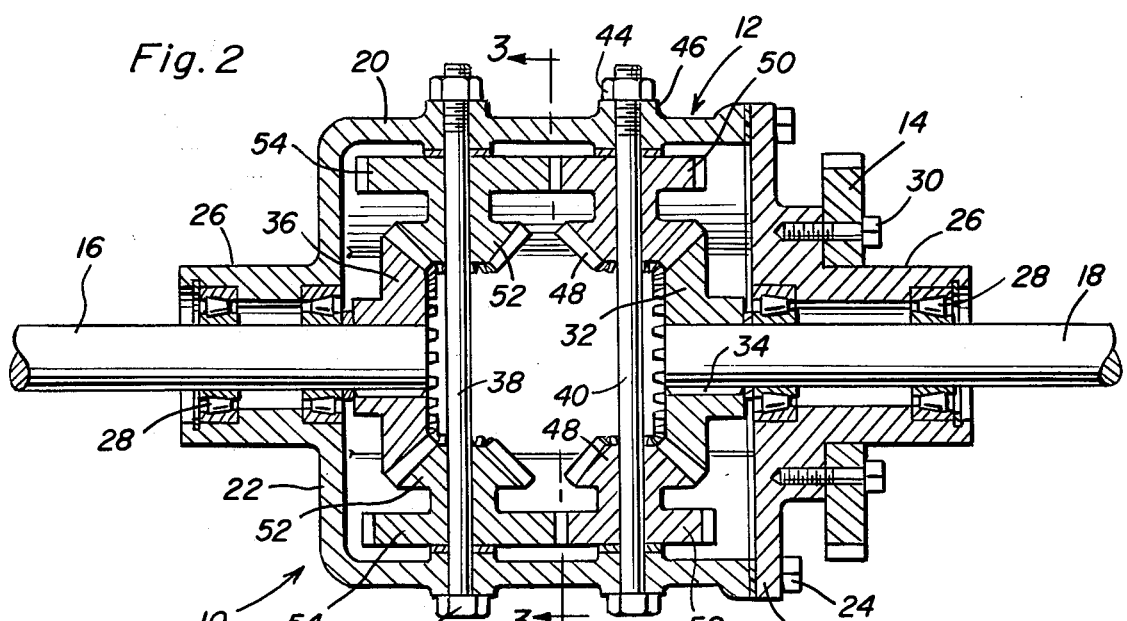
FIG. 2 is a longitudinal sectional view of the power transfer device of the present invention taken substantially upon a plane passing along section line 2—2 of FIG. 1 illustrating the structure and orientation of the components of the device.

The inner end of the stationary shaft 18 is provided with a bevel gear 32 affixed thereto in any suitable manner such as by a keyed connection as at 34. Also, the output shaft 16 is provided with an identical bevel gear 36 attached to the output shaft 16 in the same manner. The gears 32 and 36 are in alignment with each other and axially spaced from each other within the gear box 12 as illustrated in FIG. 2. Extending in parallel relation to each other and in perpendicular relation to the bevel gears 32 and 36 and in alignment with the center of the shafts 16 and 18 is a pair of spider gear shafts 38 and 40 which extend transversely of the peripheral wall 20 and may be in the form of elongated bolts having a head 42 at one end thereof and a retaining nut 44 at the other end thereof to enable assembly and disassembly of the shafts 38 and 40 in relation to the gear box 12. The opposite portions of the peripheral wall 20 where the shafts 38 and 40 extend therethrough may be enlarged to form bosses 46 to more effectively support the shafts 38 and 40 which are stationary in relation to the gear box 12.

Figure 3:
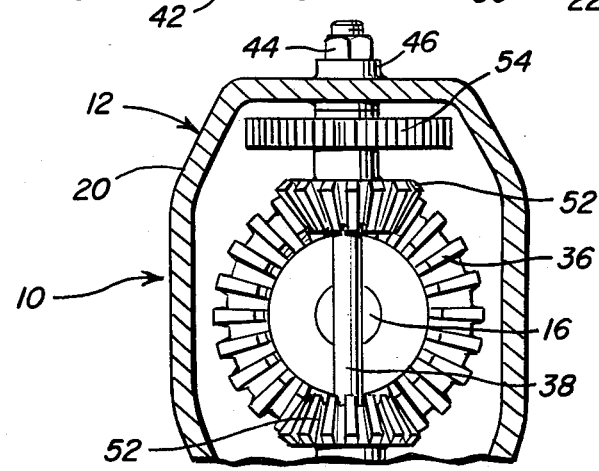
FIG. 3 is a transverse, sectional view taken substantially upon a plane passing along section line 3—3 of FIG. 2 illustrating further structural details of the gear arrangement within the gear box.

Mounted on each end of the shaft 40 is a combination bevel gear 48 and spur gear 50 which are integral with each other and rotatably journaled on the shaft 40 with the bevel gear 48 being in meshing engagement with the stationary bevel gear 32 and integral with or otherwise rigid with the spur gear 50 which is disposed radially outwardly of the bevel gear 48. As illustrated, a combination bevel gear and spur gear is oriented at each end of the shaft 40 in diametrically opposed relation to each other with the two bevel gears 48 engaging the stationary bevel gear 32 at diametrically opposed points as illustrated in FIG. 3.

The shaft 38 is also provided with a combination bevel gear 52 and spur gear 54 at each end thereof with the bevel gear 52 in meshing engagement with the rotatable bevel gear 36 connected to the rotatable output shaft 16 and the spur gear 54 being in meshing engagement and driving engagement with the spur gear 50. As illustrated, the combination bevel and spur gears on the shaft 38 are diametrically arranged in the same manner as on shaft 40 to provide dynamic balance for the gear system and equalize forces on the various components.

As illustrated, the combination bevel and spur gears are rotatable on their respective shafts 38 and 40 and the bevel gears on the shaft 40 are in meshing engagement with the bevel gear 32 and the bevel gears on the shaft 38 are in meshing engagement with the bevel gear 36 so that the geared connection between the rotatably driven gear box 12, the stationary shaft 18 and the output shaft 16 is through the stationary bevel gear 32, the bevel gears 48, the spur gears 50, the spur gears 54, the bevel gears 52 and the bevel gear 36. The spur gears 50 and 54 are of different size and have different numbers of teeth thereon to provide a predetermined drive ratio between the input gear 14 and the output shaft 16 and the rotational forces on the opposite sides of the gears 50 and 54 are neutralized with the arrangement being such that with the stationary shaft 18 locked in position in any suitable manner, such as being bolted to a frame, or the like, by the use of a flanged coupling 56, or the like, the output shaft 16 can be rotated only when the input gear 14 is being rotated. When the input gear 14 is not being rotated and the gear box 12 is stationary, the output shaft 16 cannot be rotated.

While the ratio may vary, in one embodiment in which the ratio of the input to the output is 4 to 1, the spur gear 50 may be provided with 16 teeth while the spur gear 54 has 12 teeth with, of course, corresponding diameter ratios.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A power transfer device comprising a gear box, means on the gear box for driving connection with a power source to rotate the gear box about an axis of rotation, a stationary shaft extending into and rotatably supporting the gear box and defining its axis of rotation, an output shaft extending into the gear box and journaled therefrom for rotation about the same axis as the gear box, said input and output shafts being in axial alignment with the inner ends spaced apart within the gear box, and gear means interposed between the stationary shaft, gear box and output shaft to drive the output shaft at a predetermined ratio with respect to the gear box and neutralize opposing forces within the gear box, said gear means including a stationary bevel gear on the inner end of the stationary shaft and a driven bevel gear on the inner end of the output shaft, a pair of stationary, parallel shafts extending transversely of the gear box in perpendicular intersecting relation to the axis of rotation thereof, a bevel gear and spur gear journaled on each of said parallel shafts, said bevel gear and spur gear on each parallel shaft being rigid with respect to each other, the bevel gear on one of the parallel shafts being meshed with the bevel gear on the stationary shaft, the bevel gear on the other of the parallel shafts being meshed with the bevel gear on the output shaft, said bevel gears on the parallel shafts being laterally spaced from each other and rigid with the spur gear on the same shaft, said bevel gears and spur gears on the parallel shafts being free to rotate on their shafts, said spur gears being meshed with each other and having different rotational speeds, and a second bevel gear and spur gear journaled on each of said parallel shafts in opposed relation to the first bevel gear and spur gear to equalize forces exerted on the components, said second bevel gear and spur gear on each parallel shaft being rigid with respect to each other.

2. The device as defined in claim 1 wherein said spur gears are of different diameter and have different number of teeth thereon for varying the ratio of the rotational speed of the output shaft in relation to the rotational speed of the gear box, said shafts, gears and box and gears being arranged such that the output shaft will not rotate unless the gear box is rotated when the stationary shaft is precluded from rotating.

* * * * *